(12) United States Patent
Yu et al.

(10) Patent No.: US 11,927,861 B2
(45) Date of Patent: Mar. 12, 2024

(54) DISPLAY PANEL AND DISPLAY DEVICE

(71) Applicants: FUZHOU BOE OPTOELECTRONICS TECHNOLOGY CO., LTD., Fujian (CN); BOE Technology Group Co., Ltd., Beijing (CN)

(72) Inventors: Renhui Yu, Beijing (CN); Wen Zha, Beijing (CN); Xin Chen, Beijing (CN); Hongzhou Xie, Beijing (CN); Shangtao Zheng, Beijing (CN); Meizhen Chen, Beijing (CN); Ying Tian, Beijing (CN); Zengrong Li, Beijing (CN); Ye Hu, Beijing (CN); Qingna Hou, Beijing (CN); Kai Diao, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 114 days.

(21) Appl. No.: 17/762,668

(22) PCT Filed: May 18, 2021

(86) PCT No.: PCT/CN2021/094413
§ 371 (c)(1),
(2) Date: Mar. 22, 2022

(87) PCT Pub. No.: WO2021/233306
PCT Pub. Date: Nov. 25, 2021

(65) Prior Publication Data
US 2022/0390782 A1 Dec. 8, 2022

(30) Foreign Application Priority Data
May 20, 2020 (CN) .......................... 202010430532.4

(51) Int. Cl.
*G02F 1/1368* (2006.01)
*G02F 1/1362* (2006.01)

(52) U.S. Cl.
CPC ...... *G02F 1/1368* (2013.01); *G02F 1/136209* (2013.01); *G02F 1/136222* (2021.01)

(58) Field of Classification Search
CPC ............. G02F 1/1368; G02F 1/136222; G02F 1/136209
(Continued)

(56) References Cited

U.S. PATENT DOCUMENTS

2002/0027630 A1 3/2002 Yamada et al.
2011/0102482 A1 5/2011 Ito
(Continued)

FOREIGN PATENT DOCUMENTS

CN 102096253 A 6/2011
CN 106873205 A 6/2017
(Continued)

OTHER PUBLICATIONS

Office Action dated Mar. 16, 2022 and Search Report dated Mar. 9, 2022, issued in counterpart CN Application No. 202010430532.4, with English Machine Translation. (17 pages).

*Primary Examiner* — Edward J Glick
*Assistant Examiner* — William D Peterson
(74) *Attorney, Agent, or Firm* — WHDA, LLP (57) ABSTRACT

A display panel and a display device are disclosed, relating to the display technical field. The display panel comprises a display layer and a light control layer which are laminated, the light control layer comprises a plurality of light control pixel areas, the light control pixel areas comprise a thin film transistor, the display layer comprises a plurality of display pixel areas, and the display pixel areas comprise a green sub-pixel; the orthographic projection of the green sub-pixel
(Continued)

on the light control pixel area is close to the area where the thin film transistor is located.

18 Claims, 7 Drawing Sheets

(58) Field of Classification Search
USPC .......................................................... 349/33
See application file for complete search history.

(56) References Cited

U.S. PATENT DOCUMENTS

| | | |
|---|---|---|
| 2018/0275438 A1* | 9/2018 | Mori ................. G02F 1/136286 |
| 2019/0129225 A1 | 5/2019 | Lee et al. |
| 2020/0012152 A1 | 1/2020 | Shih et al. |
| 2020/0103687 A1 | 4/2020 | Chang |
| 2020/0166814 A1* | 5/2020 | Guan .................. G02F 1/13454 |
| 2020/0393728 A1 | 12/2020 | Zhang et al. |
| 2021/0173246 A1 | 6/2021 | Du et al. |
| 2021/0333657 A1 | 10/2021 | Xu et al. |

FOREIGN PATENT DOCUMENTS

| | | | |
|---|---|---|---|
| CN | 108445683 A | 8/2018 | |
| CN | 109407429 A | 3/2019 | |
| CN | 110361899 A | * 10/2019 | ....... G02F 1/133531 |
| CN | 110361899 A | 10/2019 | |
| CN | 110412798 A | 11/2019 | |
| CN | 110967864 A | 4/2020 | |
| TW | 201917464 A | 5/2019 | |
| TW | I691759 B | 4/2020 | |

\* cited by examiner

DISPLAY PANEL AND DISPLAY DEVICE

The present disclosure claims the priority of the Chinese patent application filed on May 20, 2020 before the Chinese Patent Office with the application No. 202010430532.4 and entitled "DISPLAY PANEL AND DISPLAY DEVICE", which is incorporated herein in its entirety by reference.

TECHNICAL FIELD

The present disclosure relates to the display technical field, and particularly relates to a display panel and a display device.

BACKGROUND

The dual cell technology is also called screen overlapping technology, namely, one color display layer (Main Cell) and one black-and-white light control layer (Sub Cell) are overlapped for use. With the high-dynamic range (HDR) rendering technology, the dual cell technology can make the bright part of the image brighter and the dark part darker, thereby achieving ultra-high contrast. The black detail performance is close to organic light-emitting diode (OLED) television, while the brightness of the highlighted part exceeds OLED television.

The dual cell technology uses the pixel scale level divisional dimming control of a liquid crystal panel to realize the local backlight modulation (local dimming) technology of millions of individual areas. Each millimeter interval of the screen may be several controllable backlight divisions. The division accuracy of light source achieved by the dual cell technology is difficult to achieve by the traditional backlight technology, and it has great application prospects.

SUMMARY

The present disclosure provides a display panel and a display device.

The present disclosure discloses a display panel, comprising a display layer and a light control layer which are laminated. The light control layer comprises a plurality of light control pixel areas, the light control pixel areas comprise a thin film transistor, the display layer comprises a plurality of display pixel areas, and the display pixel areas comprise a green sub-pixel; the orthographic projection of the green sub-pixel on the light control pixel area is close to the area where the thin film transistor is located.

Optionally, the display pixel area further comprises a blue sub-pixel; and the orthographic projection of the blue sub-pixel on the light control pixel area is away from the area where the thin film transistor is located.

Optionally, an inside of the light control pixel area comprises a black matrix, the black matrix forming an inverted T-shape.

Optionally, an overlapping area of the black matrix inside the display pixel area and the black matrix inside the light control pixel area is smaller than a preset area.

Optionally, one light control pixel area corresponds to four display pixel areas, each of the display pixel areas comprises one pixel unit, and one light control pixel area comprises three thin film transistors; and three thin film transistors are respectively used for controlling backlight brightness of four pixel units.

Optionally, the light control pixel area comprises an upper left sub-area, an upper right sub-area, and a lower sub-area; and the thin film transistor located in the lower sub-area synchronously controls the backlight brightness of two lower pixel units, the thin film transistor located in the upper left sub-area controls backlight brightness of the upper left one pixel unit, and the thin film transistor located in the upper right sub-area controls backlight brightness of the upper right one pixel unit.

Optionally, the light control pixel area comprises an upper left sub-area, a middle sub-area, and a lower sub-area; and the thin film transistor located in the lower sub-area synchronously controls backlight brightness of two lower pixel units, the thin film transistor located in the upper left sub-area controls the backlight brightness of the upper left one pixel unit, and the thin film transistor located in the middle sub-area controls the backlight brightness of the upper right one pixel unit.

Optionally, a display device comprising the display panel.

Optionally, the display device further comprises a driving circuit board, an edge of the light control layer is provided with a first signal connecting end, and the edge of the display layer is provided with a second signal connecting end; the first signal connecting end is electrically connected to the driving circuit board and to the second signal connecting end.

Optionally, a signal required by the light control layer and the signal required by the display layer are distinguished by using timing sequence when transmitted through the first signal connecting end.

Optionally, the display device further comprises a driving circuit board, the edge of the light control layer is provided with a first signal connecting end and a third signal connecting end, and the edge of the display layer is provided with a second signal connecting end; the first signal connecting end and the third signal connecting end are respectively electrically connected to the driving circuit board and the first signal connecting end is also electrically connected to the second signal connecting end.

Optionally, the first signal connecting end, all of the second signal connecting end, and the third signal connecting end are golden fingers.

Optionally, the first signal connecting end is electrically connected to the second signal connecting end via an anisotropic conductive adhesive.

Optionally, the anisotropic conductive adhesive comprises a rigid silicon ball and a flexible conductive particle.

Optionally, the light control layer comprises a cell-aligned first array substrate and a first color film substrate, and the first array substrate and the first color film substrate are provided with a liquid crystal layer; and the display layer comprises a cell-aligned second array substrate and a second color film substrate, and the second array substrate and the second color film substrate are provided with a liquid crystal layer.

Optionally, the first signal connecting end is located on one side of the first array substrate of the light control layer facing the display layer, and the second signal connecting end is located on one side of the second array substrate of the display layer facing the light control layer, the first signal connecting end being located opposite to the second signal connecting end.

Optionally, the first color film substrate of the light control layer is laminated to the second color film substrate of the display layer.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to illustrate the embodiments of the present disclosure or the technical solutions in the related art more clearly, the following will briefly introduce the accompanying drawings needed to be used in the description of the embodiments or related art; obviously, the drawings in the description below are some embodiments of the present disclosure, and for those of ordinary skills in the art, other drawings can also be obtained from these drawings without creative efforts.

DETAILED DESCRIPTION

In order to make the above objects, features, and advantages of the present disclosure more obvious and understandable, the present disclosure will be described in further detail below with reference to the accompanying drawings and specific implementation modes. Obviously, the described embodiments are some, but not all, embodiments of the present disclosure. Based on the embodiments in the present disclosure, all other embodiments obtained by a person of ordinary skills in the art without inventive efforts fall within the scope of the present disclosure.

Figure 1:
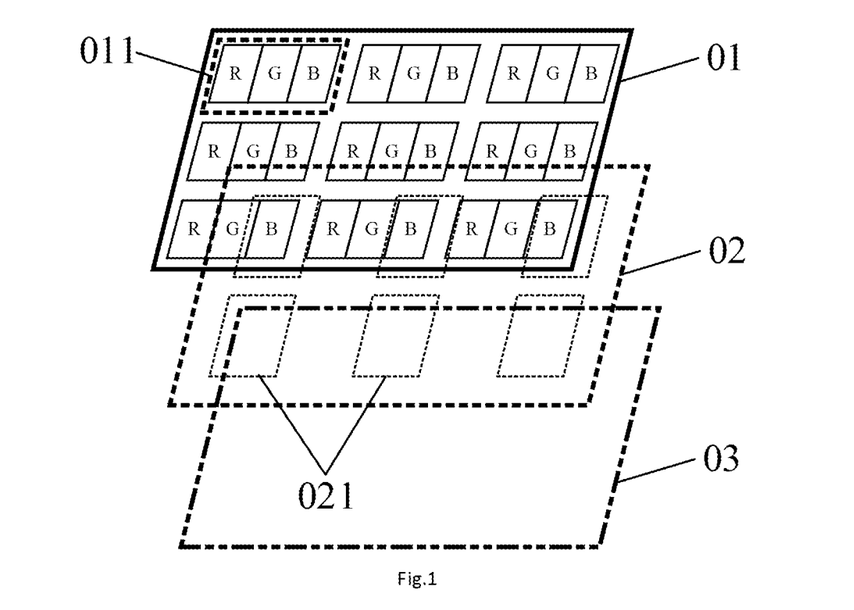
FIG. 1 shows a schematic view of a related art dual cell display device.

FIG. 1 shows a schematic view of a related art dual cell display device. Referring to FIG. 1, the dual cell display device includes a dual cell display panel and a backlight module 03, and the dual cell display panel includes a display layer (Main Cell) 01 and a light control layer (Sub Cell) 02. The display layer 01 comprises a plurality of display pixel areas 011. As shown in FIG. 1, each display pixel area 011 comprises one pixel unit, namely, comprising a red sub-pixel R, a green sub-pixel G, and a blue sub-pixel B, and the display layer 01 can be used for realizing a normal display function. The structure of the light control layer 02 is basically the same as that of the display layer 01, and the main difference is that no red, green, and blue color resists are provided on the light control layer 01. As shown in FIG. 1, the light control layer 01 includes a plurality of light control pixel areas 021, each of which can individually control light emission so that the light control layer 01 can perform local backlight brightness modulation. The backlight module 03 below the light control layer 02 is a side type or direct type backlight module.

Figure 2:
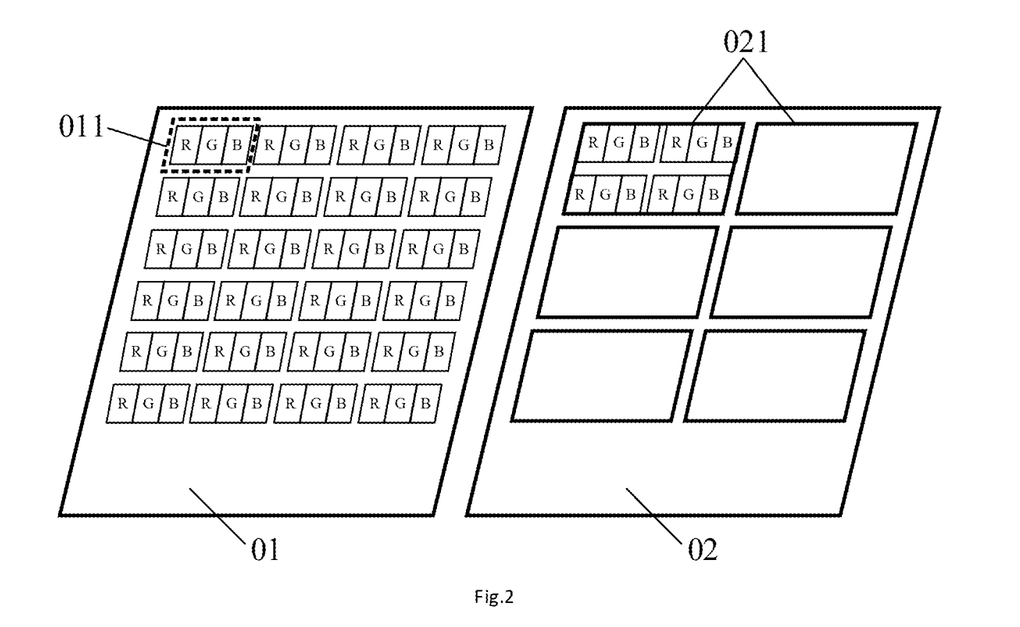
FIG. 2 shows a schematic view of a display layer and a light control layer of a mainstream dual cell display product of the related art.

FIG. 2 shows a schematic view of a display layer and a light control layer of a mainstream dual cell display product of the related art. Referring to FIG. 2, in the current mainstream dual cell display products, one light control pixel area 021 of the light control layer 01 corresponds to four display pixel areas 011 of the display layer 01, namely, one light control pixel area 021 can be used for modulating the backlight brightness of the four display pixel areas 011.

Table 1 shows the light transmittance data of various color resistances of the mainstream dual cell display products as below. Referring to Table 1, since the light transmittances of three kinds of sub-pixel color resistances of R, G, and B are different, the color resistances of various colors have different effects on the brightness. The light transmittance of the green G color resistance is the highest. The green G color resistance occupies 72.3% of the brightness contribution value and has the greatest effect on the brightness. The light transmittance of the blue B color resistance is the lowest. The blue B color resistance occupies only 7.63% of the brightness contribution value and has the least effect on the brightness.

TABLE 1

|  | White picture L255 | R picture L255 | G picture L255 | B picture L255 |
| --- | --- | --- | --- | --- |
| brightness | 242 | 46.7 | 175 | 18.47 |
| brightness proportion | 100% | 19.3% | 72.3% | 7.63% |

Figure 3:
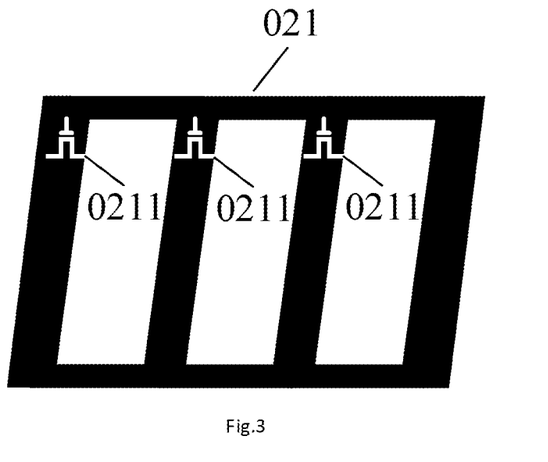
FIG. 3 is a schematic view showing a black matrix arrangement of a light control pixel area of the related art.

Referring to FIG. 3, a schematic view of a black matrix arrangement of a light control pixel area in the related art is shown. One light control pixel area 021 may generally include a plurality of thin film transistors 0211, for example, three thin film transistors 0211, as shown in FIG. 3, the thin film transistor 0211 is blocked by the black matrix so as not to affect light emission of the light control pixel area 021. Each of thin film transistors 0211 can respectively control one sub-area of the light control pixel area 021, thereby achieving brightness gray scale control of the light control pixel area 021. The thin film transistor 0211 is generally located at the upper left corner or the upper right corner of the controlled sub-area.

However, in practical applications, the area near the thin film transistor 0211 in the light control pixel area 021 needs to be provided with a relatively wide black matrix to block light. Therefore, light in the area where the thin film transistor 0211 is located, i. e. near the TFT area of the light control layer 02, will be relatively insufficient.

However, as shown in FIG. 2, the way of the arrangement for the R, G, and B sub-pixels in the display pixel area 011 is generally fixed; therefore, in a specific application, when the orthographic projection of the green G color resistance with the maximum brightness contribution on the light control pixel area 021 is close to the area with sufficient light, and/or the orthographic projection of the blue B color resistance with the minimum brightness contribution on the light control pixel area 021 is close to the TFT area with insufficient light, the control of the brightness gray scale by the light control layer 02 is less fine, that is to say, the light control accuracy of the brightness gray scale by the light control layer 02 is low, thereby reducing the local dimming effect of the dual cell display panel.

In summary, with regard to the dual cell display panel and dual cell display device in the related art, a display panel and a display device in the embodiment of the present disclosure are proposed to solve the problem that the light control accuracy of the light control layer in the dual cell display panel for the brightness gray scale is low, which further reduces the local dimming effect.

Figure 4:
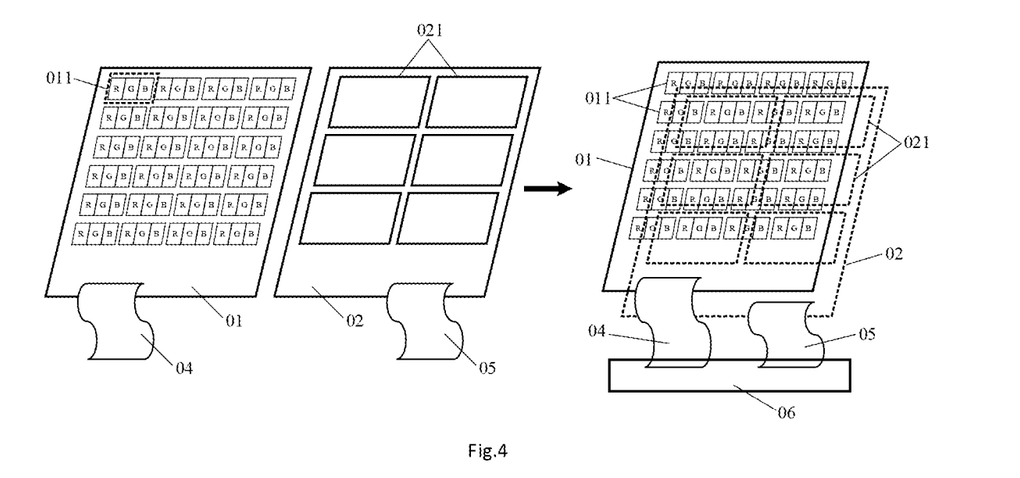
FIG. 4 is a schematic view showing a circuit board connection of a dual cell display device of the related art.

In addition, FIG. 4 is a schematic view showing a circuit board connection of a dual cell display device of the related art. Referring to FIG. 4, a display layer 01 can be electrically connected to a driving circuit board 06 via a first flexible circuit board 04, and a light control layer 02 can be electrically connected to the driving circuit board 06 via a second flexible circuit board 05, wherein the driving circuit board 06 is used for inputting a signal required for displaying to the display layer 01 and inputting a signal required for local backlight modulation to the light control layer 02, so as to realize the display control of the dual cell display panel.

Figure 5:
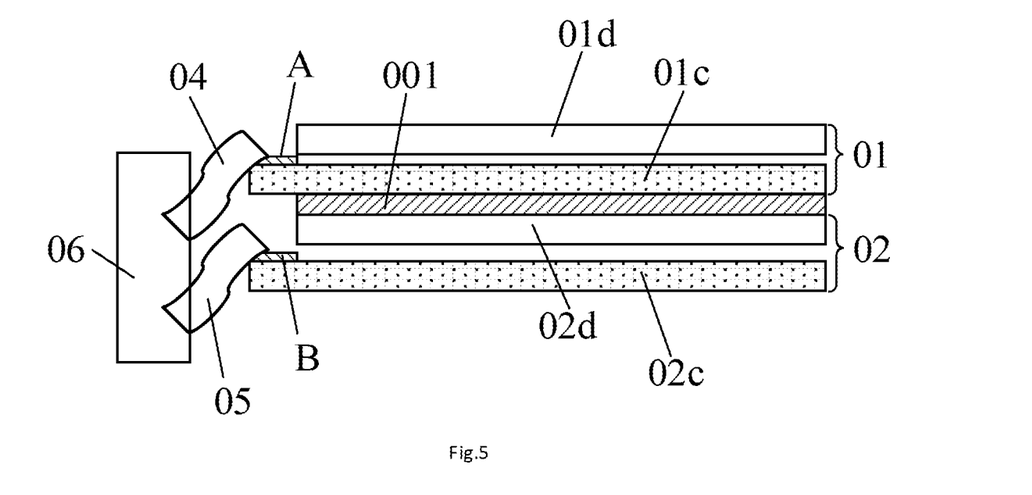
FIG. 5 is a schematic view showing an overlapped layer of a dual cell display device of the related art.

FIG. 5 is a schematic view showing an overlapped layer of a dual cell display device of the related art. Referring to FIG. 5, a light control layer 02 comprises a cell-aligned first array substrate 02c and a first color film substrate 02d, wherein a liquid crystal layer (not shown in the figure) is arranged between the first array substrate 02c and the first color film substrate 02d. A display layer 01 comprises a cell-aligned second array substrate 01c and a second color film substrate 01d, wherein a liquid crystal layer (not shown in the figure) is also arranged between the second array substrate 01c and the second color film substrate 01d. As shown in FIG. 5, the second array substrate 01c of the display layer 01 is provided with A signal connecting end, and the A signal connecting end is electrically connected to the driving circuit board 06 via the first flexible circuit board 04. The second array substrate 01c of the light control layer 02 is provided with a B signal connecting end, and the B signal connecting end is electrically connected to the driving circuit board 06 via the second flexible circuit board 05. In addition, the first color film substrate 02d of the light control layer 02 and the second array substrate 01c of the display layer 01 can be laminated via an optical adhesive layer 001.

In practical applications, in the related art, the display layer 01 and the light control layer 02 in a dual cell overlapped layer are respectively manufactured according to a module production process, and then assembled via a laminating process, which is equivalent to the superposition of two sets of module processes. That is to say, the display layer 01 and the light control layer 02 need two module binding processes to realize the electrical connection of a dual cell to a control end. Therefore, the dual cell display panel and the dual cell display device in the related art also have the problems of a large module production investment and a low module binding efficiency.

Figure 6:
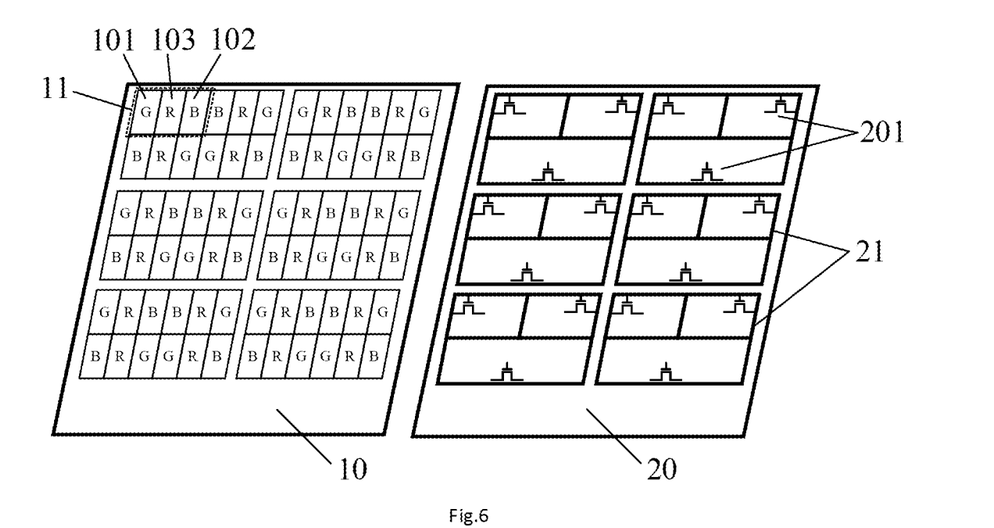
FIG. 6 is a schematic view showing a display layer and a light control layer of an embodiment of the present disclosure.

An embodiment of the present disclosure provides a display panel comprising a display layer and a light control layer which are laminated. FIG. 6 is a schematic view showing a display layer 10 and a light control layer 20 of an embodiment of the present disclosure. Referring to FIG. 6, the light control layer 20 comprises a plurality of light control pixel areas 21. The light control pixel area 21 comprises a thin film transistor 201. Referring to FIG. 6, the display layer 10 comprises a plurality of display pixel areas 11. The display pixel area 11 comprises a green sub-pixel 101. The orthographic projection of the green sub-pixel 101 on the light control pixel area 21 is close to the area where the thin film transistor 201 is located.

In the embodiment of the present disclosure, the light in the area where the thin film transistor 201 is located, namely, near the TFT area of the light control layer 20, will be relatively insufficient, and the brightness contribution of the green G color resistance is the biggest. Therefore, the green sub-pixel 101 can be arranged close to the thin film transistor 201 of the light control layer 20 so that the orthographic projection of the green sub-pixel 101 with the greatest influence on the brightness on the light control pixel area 21 is close to the TFT area of the light control layer 20 where the light is insufficient. So that the control of the brightness gray scale by the light control layer 02 can be made finer, and the light control accuracy of the brightness gray scale by the light control layer 02 is improved, and the local dimming effect of the dual cell display panel is thus improved.

Optionally, the display pixel area 11 further comprises a blue sub-pixel 102; the orthographic projection of the blue sub-pixel 102 on the light control pixel area 21 is away from the area where the thin film transistor 201 is located.

In the embodiment of the present disclosure, the light in the area where the thin film transistor 201 is located, namely, near the TFT area of the light control layer 20, will be relatively insufficient, while the light away from the TFT area in the light control pixel area 21 is relatively sufficient, and the brightness contribution of the blue B color resistance is minimal. Therefore, by arranging the blue sub-pixel 102 away from the thin film transistor 201 of the light control layer 20, the orthographic projection of the blue sub-pixel 102 with the least influence on the brightness on the light control pixel area 21 is away from the TFT area where the light of the light control layer 20 is insufficient and is close to the area where the light is sufficient so that the control of the brightness gray scale by the light control layer 02 can be further refined, the light control accuracy of the light control layer 02 for the brightness gray scale is further improved, and the local dimming effect of the dual cell display panel is further improved.

In specific applications, the thin film transistor of the light control layer and each sub-pixel of the display layer may be arranged according to the principle that the orthographic projection of the green sub-pixel on the light control pixel area is close to the area where the thin film transistor is located, and the orthographic projection of the blue sub-pixel on the light control pixel area is away from the area where the thin film transistor is located. The embodiments of the present disclosure do not specifically define the arrangement mode of the thin film transistor of the light control layer and the arrangement mode of each sub-pixel of the display layer.

Figure 7:
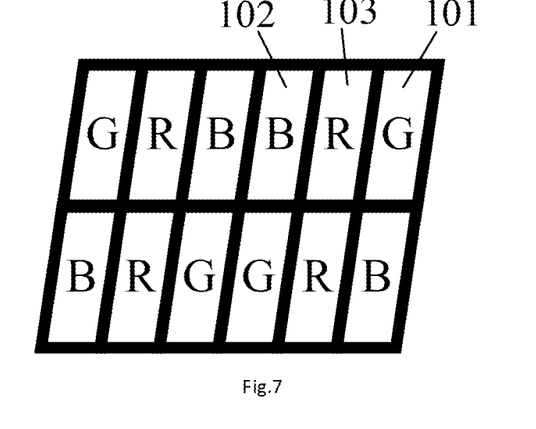
FIG. 7 is a schematic view showing an arrangement of each sub-pixel of a display pixel area according to an embodiment of the present disclosure.
Figure 8:
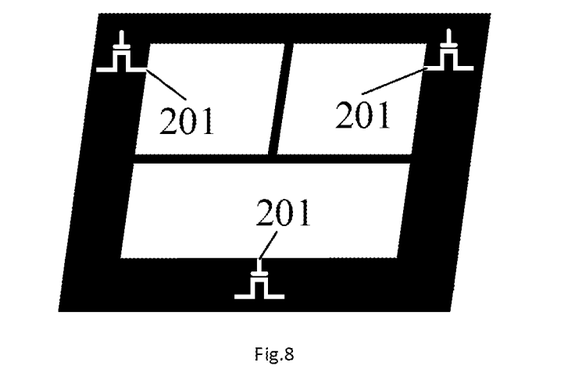
FIG. 8 is a schematic view showing an arrangement of a thin film transistor of a light control pixel area according to an embodiment of the present disclosure.

For example, FIG. 7 is a schematic view showing an arrangement of each sub-pixel of a display pixel area 11. FIG. 8 is a schematic view showing an arrangement of a thin film transistor of a light control pixel area 21. Referring to FIGS. 7 and 8, one light control pixel area 21 may correspond to four display pixel areas 11, namely, one light control pixel area 21 can be used for modulating the backlight brightness of four pixel units. The light control pixel area 21 can be divided into three sub-areas; the upper left sub-area can control the backlight brightness of one pixel unit in the upper left via one thin film transistor 201; the upper right sub-area can control the backlight brightness of one pixel unit in the upper left via one thin film transistor 201; the lower sub-area can synchronously control the backlight brightness of two lower pixel units via one thin film transistor 201. According to the principle that the orthographic projection of the green sub-pixel on the light control pixel area is close to the area where the thin film transistor is located, and the orthographic projection of the blue sub-pixel on the light control pixel area is away from the area where the thin film transistor is located, the green sub-pixel 101, the blue sub-pixel 102, and the red sub-pixel 103 of the display pixel area 11 can be arranged in the manner shown in FIG. 7, and the thin film transistor 201 of the light control pixel area 21 can be arranged in the manner shown in FIG. 8.

Figure 9:
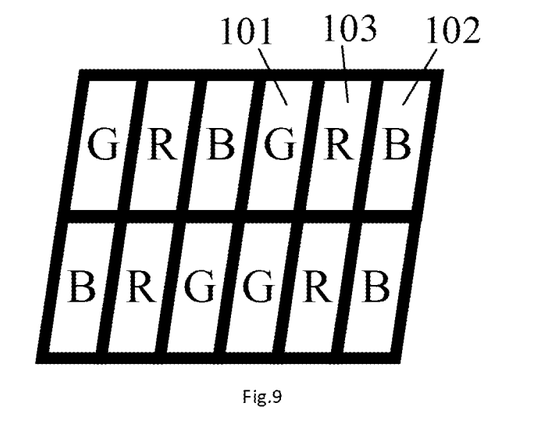
FIG. 9 is a schematic view showing another arrangement of each sub-pixel of a display pixel area according to an embodiment of the present disclosure.
Figure 10:
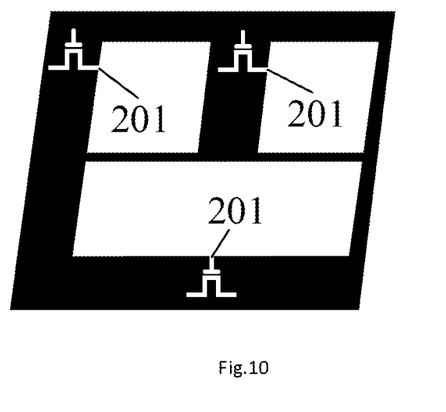
FIG. 10 is a schematic view showing another arrangement of a thin film transistor of a light control pixel area according to an embodiment of the present disclosure.

As another example, FIG. 9 is a schematic view showing another arrangement of each sub-pixel of a display pixel area 11. FIG. 10 is a schematic view showing another arrangement of a thin film transistor of a light control pixel area 21. As shown in FIG. 10, the light control pixel area comprises an upper left sub-area, a middle sub-area, and a lower sub-area. According to the principle that the orthographic projection of the green sub-pixel on the light control pixel area is close to the area where the thin film transistor is located, and the orthographic projection of the blue sub-pixel on the light control pixel area is away from the area where the thin film transistor is located, the green sub-pixel 101, the blue sub-pixel 102, and the red sub-pixel 103 of the display pixel area 11 can also be arranged in the manner shown in FIG. 9, and the thin film transistor 201 of the light control pixel area 21 can also be arranged in the manner shown in FIG. 10. Specifically, the thin film transistor located in the lower sub-area can synchronously control the backlight brightness of the lower two pixel units, the thin film transistor located in the upper left sub-area can control the backlight brightness of one pixel unit in the upper left, and the thin film transistor located in the middle sub-area can control the backlight brightness of one pixel unit in the upper right.

It needs to be noted that in the embodiments of the present disclosure, it is not limited that one light control pixel area 21 corresponds to four display pixel areas 11, nor is it limited that one display pixel area 11 includes four pixel units, which will not be specifically defined by embodiments of the present disclosure.

In addition, in comparison with the black matrix arrangement mode of the light control pixel area shown in FIG. 3, in FIGS. 8 and 10, the black matrix portion located inside the light control pixel area can form one inverted T-shaped Mark shape, and can be used for assembling and aligning, thereby improving alignment accuracy. In addition, since the positions of the black matrices of the upper cell and lower cell (display layer and light control layer) are staggered, and in particular, the black matrix portions of the inside the display pixel area and inside the light control pixel area are less overlapped, the overlapping area can be smaller than a preset area, and the preset area can be set according to practical requirements, and this is not limited in the embodiments of the present disclosure so that moire patterns generated due to insufficient alignment accuracy of the black matrices can be reduced. In the embodiments of the present disclosure, moire patterns can be reduced without increasing the line width of a black matrix, which can save material for the black matrix.

In an embodiment of the present disclosure, a display panel comprises a display layer and a light control layer which are laminated. The light control layer comprises a plurality of light control pixel areas, the light control pixel areas comprise a thin film transistor, the display layer comprises a plurality of display pixel areas, and the display pixel areas comprise green sub-pixel. The orthographic projection of the green sub-pixel on the light control pixel area is close to the area where the thin film transistor is located. In the embodiment of the present disclosure, by arranging the green sub-pixel close to the thin film transistor of the light control layer, the orthographic projection of the green sub-pixel, which has the greatest influence on the brightness, on the light control pixel area is close to the area of the light control layer where light is insufficient so that the control of the brightness gray scale by the light control layer can be made finer, the light control accuracy of the brightness gray scale by the light control layer is improved, and the local dimming effect of the dual cell display panel is further improved.

An embodiment of the present disclosure also discloses a display device including the above-described display panel.

Figure 11:
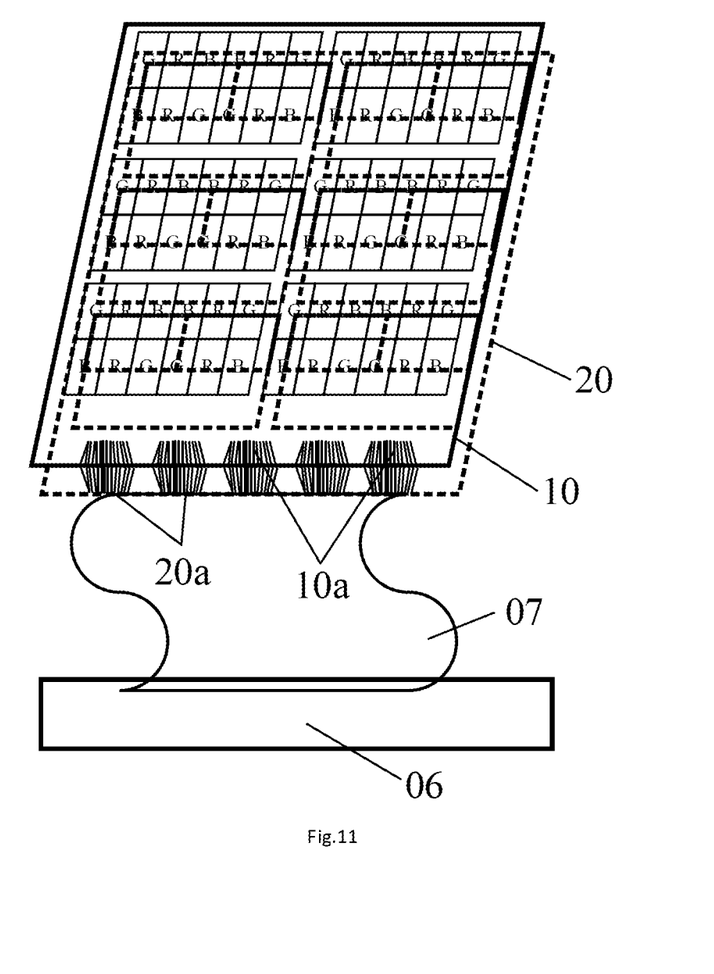
FIG. 11 is a schematic view showing a display device according to an embodiment of the present disclosure.

FIG. 11 is a schematic view showing a display device according to an embodiment of the present disclosure. Referring to FIG. 11, optionally, the display device further comprises a driving circuit board 06, an edge of the light control layer 20 is provided with a first signal connecting end 20a, and the edge of the display layer 10 is provided with a second signal connecting end 10a. The first signal connecting end 20a is electrically connected to the driving circuit board 06 and to the second signal connecting end 10a.

As shown in FIG. 11, the driving circuit board 06 can input a signal required by the light control layer 20 to the light control layer 20 through the first signal connecting end 20a, and can input a signal required by the display layer 10 to the display layer 10 through the first signal connecting end 20a and the second signal connecting end 10a in sequence. The light control layer 20 is directly electrically connected to the driving circuit board 06, and the display layer 10 is indirectly electrically connected to the driving circuit board 06 via the light control layer 20 so that only one module binding process is required to realize the electrical connection between the dual cell (the display layer 10 and the light control layer 20) and the control end (the driving circuit board 06). The first signal connecting end 20a of the light control layer 20 can be electrically connected to the driving circuit board 06 via the third flexible circuit board 07.

In the above-mentioned implementation mode, since the signal required by the light control layer 20 and the signal required by the display layer 10 both need to be transmitted via the first signal connecting end 20a of the light control layer 20, the above-mentioned two signals can be distinguished by timing sequence in a specific application.

Figure 12:
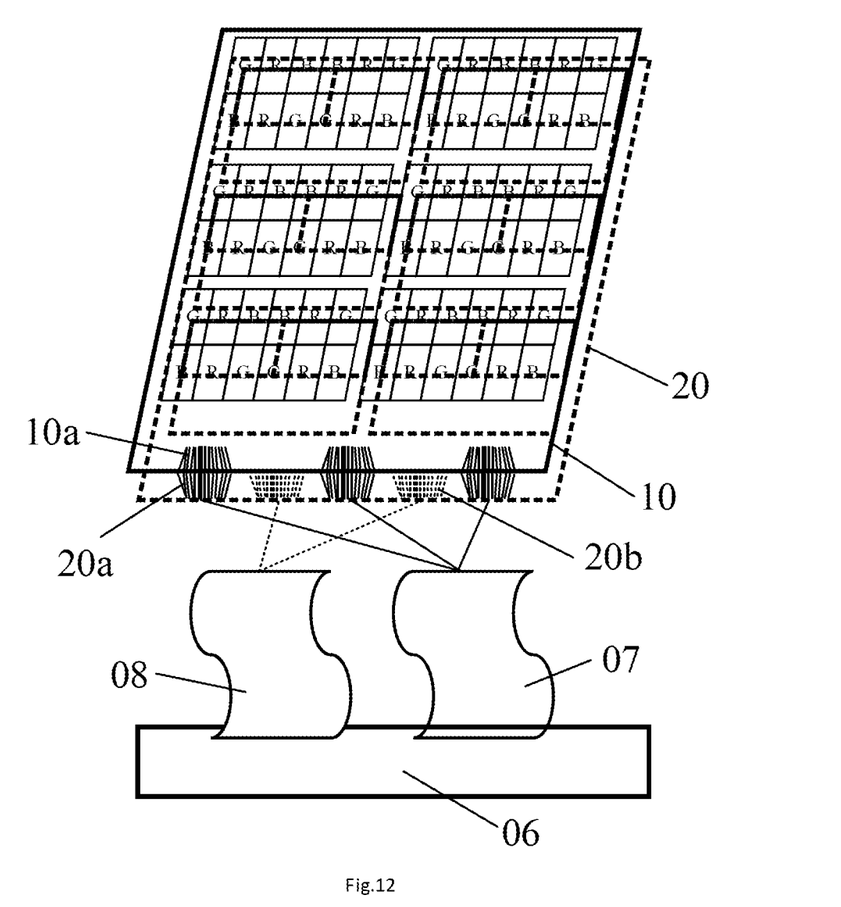
FIG. 12 is a schematic view showing another display device according to an embodiment of the present disclosure.

FIG. 12 is a schematic view showing another display device according to an embodiment of the present disclosure. Referring to FIG. 12, optionally, the display device further comprises a driving circuit board 06, an edge of the light control layer 20 is provided with a first signal connecting end 20a and a third signal connecting end 20b, and the edge of the display layer 10 is provided with a second signal connecting end 10a. The first signal connecting end 20a and the third signal connecting end 20b are respectively electrically connected to the driving circuit board 06 and the first signal connecting end 20a is also electrically connected to the second signal connecting end 10a.

As shown in FIG. 12, the driving circuit board 06 may input a signal required by the light control layer 20 to the light control layer 20 through the third signal connecting end 20b, and may input a signal required by the display layer 10 to the display layer 10 through the first signal connecting end 20a and the second signal connecting end 10a in sequence. The light control layer 20 is directly electrically connected to the driving circuit board 06, and the display layer 10 is indirectly electrically connected to the driving circuit board 06 via the light control layer 20 so that only one module binding process is required to realize the electrical connection between the dual cell (the display layer 10 and the light control layer 20) and the control end (the driving circuit board 06). The first signal connecting end 20a of the light control layer 20 can be electrically connected to the driving circuit board 06 via the third flexible circuit board 07, and the third signal connecting end 20b of the light control layer 20 can be electrically connected to the driving circuit board 06 via the fourth flexible circuit board 08.

In the above-mentioned implementation mode, since the signal required by the light control layer 20 needs to be transmitted through the third signal connecting end 20b of the light control layer 20, and the signal required by the display layer 10 needs to be transmitted through the first signal connecting end 20a of the light control layer 20, the above-mentioned two signals can be distinguished by using different signal connecting ends of the light control layer 20 in a specific application.

In an embodiment of the present disclosure, the display layer 10 and the light control layer 20 can be electrically connected, and only the light control layer 20 is connected to the driving circuit board 06; therefore, only one module processing is required to realize the electrical connection of the dual cell to the control end (the driving circuit board 06).

Optionally, in practical applications, the first signal connecting end 20a, the second signal connecting end 10a, and the third signal connecting end 20b may all be golden fingers.

It needs to be noted that the embodiments of the present disclosure do not specifically limit the number of flexible circuit boards used to connect the light control layer 20 to the driving circuit board 06.

Figure 13:
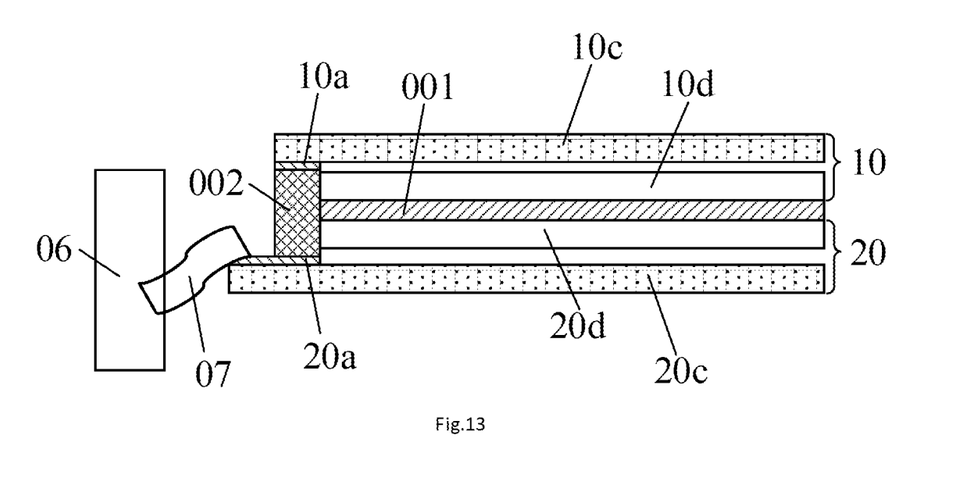
FIG. 13 is a schematic view showing an overlapped layer of a display device according to an embodiment of the present disclosure.
Figure 14:
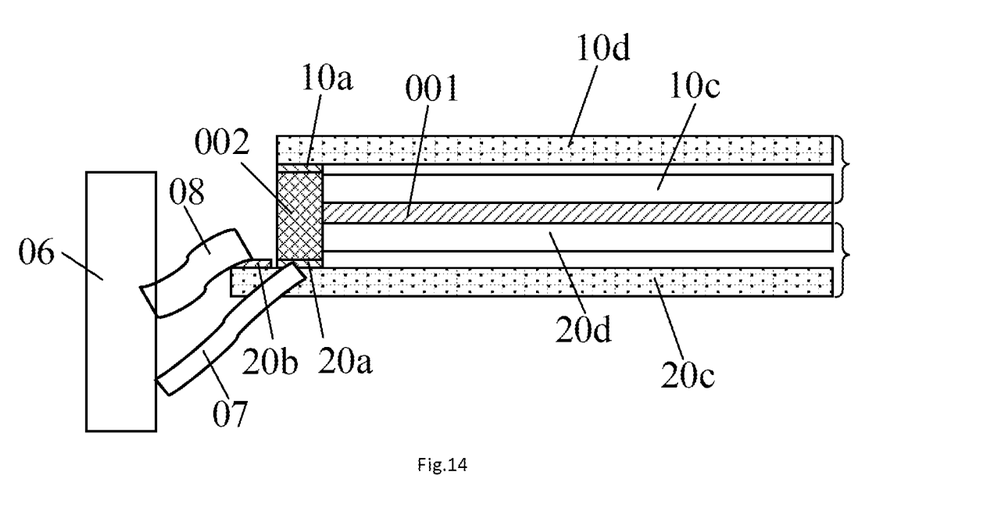
FIG. 14 is a schematic view showing an overlapped layer of another display device according to an embodiment of the present disclosure.

FIG. 13 is a schematic view showing an overlapped layer of a display device corresponding to FIG. 11, and FIG. 14 is a schematic view showing an overlapped layer of a display device corresponding to FIG. 12. Referring to FIGS. 13 and 14, a light control layer 20 comprises cell-aligned first array substrate 20c and first color film substrate 20d, wherein a liquid crystal layer (not shown in the figure) is arranged between the first array substrate 20c and the first color film substrate 20d. A display layer 10 comprises cell-aligned second array substrate 10c and second color film substrate 10d, wherein a liquid crystal layer (not shown in the figure) is also arranged between the second array substrate 10c and the second color film substrate 10d.

Optionally, referring to FIGS. 13 and 14, the first signal connecting end 20a may be electrically connected to the second signal connecting end 10a via an anisotropic conductive adhesive 002.

Figure 15:
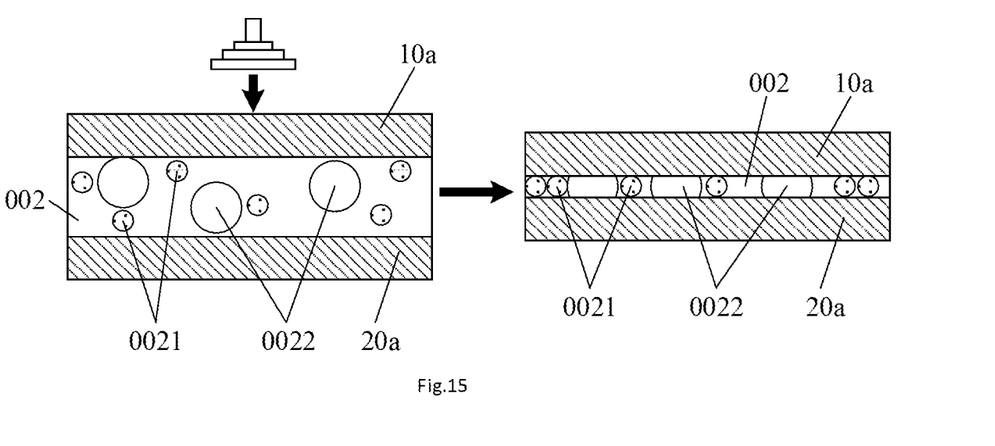
FIG. 15 is a schematic view showing the lamination of a display layer and a light control layer according to an embodiment of the present disclosure.

Optionally, FIG. 15 is a schematic view showing the lamination of a display layer 10 and a light control layer 20 according to an embodiment of the present disclosure. Referring to FIG. 15, the anisotropic conductive adhesive 002 may comprise rigid silicon ball 0021 and flexible conductive particle 0022. The rigid silicon ball 0021 can be used for controlling the laminating interval, the larger the diameter of the rigid silicon ball 0021 is, the larger the laminating interval is. The flexible conductive particle 0022 can be used for realizing the electrical connection between the first signal connecting end 20a and the second signal connecting end 10a.

Optionally, referring to FIG. 15, the first signal connecting end 20a is located on one side of the first array substrate 20c of the light control layer 20 facing the display layer 10, and the second signal connecting end 10a is located on one side of the second array substrate 10c of the display layer 10 facing the light control layer 20, the first signal connecting end 20a being located opposite to the second signal connecting end 10a.

Optionally, the first color film substrate 20d of the light control layer 20 is laminated to the second color film substrate 10d of the display layer 10.

In an embodiment of the present disclosure, since the signal connecting ends are all arranged on the array substrate, the positions of the second array substrate 10c and the second color film substrate 10d of the display layer 10 can be exchanged, and the position of the first signal connecting end 20a of the light control layer 20 is opposite to the position of the second signal connecting end 10a of the display layer 10 so that the lamination of the anisotropic conductive adhesive 002 can be facilitated In an embodiment of the present disclosure, a golden finger for transmitting a signal required by the display layer 10 may be arranged to face downwards, while the same golden finger for module binding is arranged at a corresponding position on the light control layer 20. When performing the laminating process of the display layer 10 and the light control layer 20, an anisotropic conductive adhesive can be used in the bonding area. The adhesive contains a certain number of rigid silicon balls and a certain number of flexible conductive particles. The rigid silicon ball is used for controlling the laminating interval, and the flexible conductive particle is used for realizing the electrical connection between the upper golden finger and the lower golden finger. In this way, the golden finger on the display layer 10 is connected to the light control layer 20, and then by only completing the binding process of COF (Chip On Film) on the light control layer 20 according to the module technology processing, the light control layer 20 is connected to the driving circuit board 06, thereby achieving driving integration.

In an embodiment of the present disclosure, the first signal connecting end of the edge of the light control layer can be electrically connected to the second signal connecting end of the edge of the display layer, and the first signal connecting end is also electrically connected to the driving circuit board; therefore, the display layer can be electrically connected to the driving circuit board via the light control layer so that by only performing one module binding processing on the light control layer, the electrical connection of the display layer and the light control layer to the driving circuit board can be achieved without performing module binding on the display layer. In this way, the module production investment of the dual cell display device can be reduced, and the module binding efficiency of the dual cell display device can be improved.

For the foregoing method embodiments, for the sake of simple description, they are all expressed as a series of action combinations. But those skilled in the art should know that the present disclosure is not limited by the described action sequence. Because according to the present disclosure, certain steps may be performed in other orders or simultaneously. Secondly, those skilled in the art should also know that the embodiments described in the description are all preferred embodiments, and the actions and modules involved are not necessarily essential to the present disclosure.

Each embodiment in the present description is illustrated in a progressive manner, with each embodiment focusing on differences from the other embodiments and like parts between each embodiment referring to each other.

Finally, it also needs to be noted that relational terms such as first and second, and the like, used herein are only intended to distinguish one entity or operation from another entity or operation, and do not necessarily require or imply that any such actual relationship or sequence exists between these entities or operations. Furthermore, the terms "comprise", "include", or any other variation thereof, are intended to cover a non-exclusive inclusion, such that a process, method, article, or equipment that comprises a list of elements not only includes those elements but also includes other elements not expressly listed, or further includes elements inherent to such a process, method, article, or equipment. In a case without further limitations, an element defined by the phrase "comprising one . . . " does not preclude the presence of additional identical elements in the process, method, article, or equipment that includes the element.

A display panel and a display device provided by the present disclosure are described in detail above. While specific examples have been employed herein to illustrate the principles and implementation modes of the present disclosure, the foregoing illustrations of the embodiments have been presented only to aid in the understanding of the method and core concept of the present disclosure; at the same time, for those of ordinary skills in the art, according to the concept of the present disclosure, there will be changes in the preferred embodiments and application scope. In summary, the content of the present description should not be construed as a limitation of the present disclosure.

The invention claimed is:

1. A display panel comprising: a display layer and a light control layer which are laminated;
   wherein the light control layer comprises a plurality of light control pixel areas, the light control pixel areas comprise a thin film transistor, the display layer comprises a plurality of display pixel areas, and the display pixel areas comprise a green sub-pixel; and
   an orthographic projection of the green sub-pixel on the light control pixel area is close to an area where the thin film transistor is located;
   wherein the display pixel area further comprises a blue sub-pixel, and the orthographic projection of the blue sub-pixel on the light control pixel area is away from the area where the thin film transistor is located;
   wherein an inside of the light control pixel area comprises a black matrix, the black matrix forming an inverted T-shape.

2. The display panel according to claim 1, wherein an overlapping area of the black matrix inside the display pixel area and the black matrix inside the light control pixel area is smaller than a preset area.

3. The display panel according to claim 1, wherein one light control pixel area corresponds to four display pixel areas, each of the display pixel areas comprises one pixel unit, and one light control pixel area comprises three thin film transistors; and
   the three thin film transistors are respectively used for controlling backlight brightness of the four pixel units.

4. The display panel according to claim 3, wherein the light control pixel area comprises an upper left sub-area, an upper right sub-area, and a lower sub-area; and
   the thin film transistor located in the lower sub-area synchronously controls backlight brightness of two lower pixel units, the thin film transistor located in the upper left sub-area controls backlight brightness of the upper left one pixel unit, and the thin film transistor located in the upper right sub-area controls backlight brightness of the upper right one pixel unit.

5. The display panel according to claim 3, wherein the light control pixel area comprises an upper left sub-area, a middle sub-area, and a lower sub-area; and
   the thin film transistor located in the lower sub-area synchronously controls backlight brightness of two lower pixel units, the thin film transistor located in the upper left sub-area controls the backlight brightness of the upper left one pixel unit, and the thin film transistor located in the middle sub-area controls the backlight brightness of the upper right one pixel unit.

6. A display device comprising the display panel according to claim 1.

7. The display device according to claim 6, wherein the display device further comprises a driving circuit board, an edge of the light control layer is provided with a first signal connecting end, and the edge of the display layer is provided with a second signal connecting end;
   the first signal connecting end is electrically connected to the driving circuit board and to the second signal connecting end.

8. The display device according to claim 7, wherein a signal required by the light control layer and the signal required by the display layer are distinguished by using timing sequence when transmitted through the first signal connecting end.

9. The display device according to claim 6, wherein the display device further comprises a driving circuit board, the edge of the light control layer is provided with a first signal connecting end and a third signal connecting end, and the edge of the display layer is provided with a second signal connecting end; the first signal connecting end and the third signal connecting end are respectively electrically connected to the driving circuit board and the first signal connecting end is also electrically connected to the second signal connecting end.

10. The display device according to claim 9, wherein all of the first signal connecting end, the second signal connecting end, and the third signal connecting end are golden fingers.

11. The display device according to claim 7, wherein the first signal connecting end is electrically connected to the second signal connecting end via an anisotropic conductive adhesive.

12. The display device according to claim 11, wherein the anisotropic conductive adhesive comprises a rigid silicon ball and a flexible conductive particle.

13. The display device according to claim 7, wherein the light control layer comprises a cell-aligned first array substrate and a first color film substrate, and the first array substrate and the first color film substrate are provided with a liquid crystal layer; and the display layer comprises a cell-aligned second array substrate and a second color film substrate, and the second array substrate and the second color film substrate are provided with a liquid crystal layer.

14. The display device according to claim 7, wherein the first signal connecting end is located on one side of the first array substrate of the light control layer facing the display layer, and the second signal connecting end is located on one side of the second array substrate of the display layer facing the light control layer, the first signal connecting end being located opposite to the second signal connecting end.

15. The display device according to claim 7, wherein the first color film substrate of the light control layer is laminated to the second color film substrate of the display layer.

16. The display device according to claim 9, wherein the first signal connecting end is electrically connected to the second signal connecting end via an anisotropic conductive adhesive.

17. The display device according to claim 9, wherein the light control layer comprises a cell-aligned first array substrate and a first color film substrate, and the first array substrate and the first color film substrate are provided with a liquid crystal layer; and the display layer comprises a cell-aligned second array substrate and a second color film substrate, and the second array substrate and the second color film substrate are provided with a liquid crystal layer.

18. The display device according to claim 9, wherein the first signal connecting end is located on one side of the first array substrate of the light control layer facing the display layer, and the second signal connecting end is located on one side of the second array substrate of the display layer facing the light control layer, the first signal connecting end being located opposite to the second signal connecting end.

* * * * *